US007045777B2

(12) United States Patent
Cotter

(10) Patent No.: US 7,045,777 B2
(45) Date of Patent: May 16, 2006

(54) COMBINED CHEMICAL/BIOLOGICAL AGENT MASS SPECTROMETER DETECTOR

(75) Inventor: Robert J Cotter, Baltimore, MD (US)

(73) Assignee: The Johns Hopkins University, Baltimore, MD (US)

(*) Notice: Subject to any disclaimer, the term of this patent is extended or adjusted under 35 U.S.C. 154(b) by 0 days.

(21) Appl. No.: 10/508,333

(22) PCT Filed: Apr. 9, 2003

(86) PCT No.: PCT/US03/10815

§ 371 (c)(1),
(2), (4) Date: Mar. 28, 2005

(87) PCT Pub. No.: WO2004/040612

PCT Pub. Date: May 13, 2004

(65) Prior Publication Data

US 2005/0161595 A1 Jul. 28, 2005

Related U.S. Application Data

(60) Provisional application No. 60/371,447, filed on Apr. 10, 2002.

(51) Int. Cl.
*B01D 59/44* (2006.01)
*H01J 49/00* (2006.01)
*H01J 49/40* (2006.01)

(52) U.S. Cl. ...................... 250/281; 250/282; 250/287; 250/292

(58) Field of Classification Search ................ 250/281, 250/282, 283, 286, 287, 292
See application file for complete search history.

(56) References Cited

U.S. PATENT DOCUMENTS 5,399,857 A 3/1995 Doroshenko et al.
5,464,985 A 11/1995 Cornish et al.
5,572,025 A * 11/1996 Cotter et al. ................ 250/292
5,696,376 A 12/1997 Doroshenko et al.

(Continued)

FOREIGN PATENT DOCUMENTS

WO WO 9930350 A1 * 6/1999

OTHER PUBLICATIONS

Wiley, W.C., et al., "Time-of-Flight Mass Spectrometer with Improved Resolution," The Review of Scientific Instruments, vol. 26, No. 12, Dec., 1955, pp. 1150-1157.

(Continued)

*Primary Examiner*—Frank G. Font
*Assistant Examiner*—Mary El-Shammaa
(74) *Attorney, Agent, or Firm*—Pillsbury Winthrop Shaw Pittman LLP

(57) ABSTRACT

A mass spectrometer including an ion source, a detector, a first end cap electrode arranged proximate to the ion source, a second end cap electrode arranged proximate the detector, and a ring electrode arranged between the first and the second end cap electrodes. The ring electrode can be either connected to a radio-frequency voltage source or to a constant voltage source. When the ring electrode is connected to the radio-frequency voltage the first end cap, the second end cap and the ring electrode form an ion trap and the mass spectrometer operates as an ion trap mass spectrometer. When the ring electrode is connected to a constant voltage the mass spectrometer operates as a time-of-flight mass spectrometer.

30 Claims, 9 Drawing Sheets

U.S. PATENT DOCUMENTS

2002/0145109 A1 10/2002 Doroshenko
2002/0190206 A1 12/2002 Taniguchi et al.
2003/0122070 A1 7/2003 Chang et al.

OTHER PUBLICATIONS

Kovtoun, Slava V., et al., "Mass Correlated Acceleration In a Reflectron MALDI TOF Mass Spectrometer: An Approach for Enhanced Resolution Over a Broad Mass Range," Journal of the American Society for Mass Spectrometry, Feb. 2002, vol. 13, No. 2, pp. 135-143.

Mamyrin, B.A., et al., "The mass-reflectron, a new nonmagnetic time-of-flight mass spectrometer with high resolution," Sov. Phys. JETP, vol. 37, No. 1, Jul. 1973, pp. 45-48.

Mamyrin, B.A., "Laser assisted reflection time-of-flight mass spectrometry," International Journal of Mass Spectrometry and Ion Processes 131 (1994), pp. 1-19.

Kaufmann, R., et al., "Sequencing of peptides in a time-of-flight mass spectrometer: evaluation of postsource decay following matrix-assisted laser desorption ionisation (MALDI)," International Journal of Mass Spectrometry and Ion Processes, 131 (1994) pp. 335-385.

Cotter, Robert J., "The New Time-of-Flight Mass Spectrometry," Analytical Chemistry News & Features, Jul. 1, 1999, pp. 445A-451A.

Stafford, G.C., et al., "Recent Improvements in and Analytical Applications of Advanced Ion Trap Technology," International Journal of Mass Spectrometry and Ion Processes, 60 (1984) pp. 85-98.

Louris, John N., et al., "Instrumentation, Applications, and Energy Deposition in Quadrupole Ion-Trap Tandem Mas Spectrometry," Analytical Chemistry 1987, 59, pp. 1677-1685.

Louris, John N., et al., "Ion Isolation and Sequential Stages of Mass Spectrometry in a Quadrupole ion Trap Mass Spectrometer," International Journal of Mass Spectrometry and Ion Processes, 96 (1990), pp. 117-137.

Lammert, S.A., et al., "Pulsed Axial Activation in the Ion Trap: a New Method for Performing Tandem Mass Spectroscopy (MS/MS)," Rapid Communications in Mass Spectrometry, vol. 6, (1992), pp. 528-530.

Soni, Manish H., et al., "Selective Injection and Isolation of Ions in Quadrupole Ion Trap Mass Spectrometry Using Notched Waveforms Created Using the Inverse Fourier Transform," Analytical Chemistry, vol. 66, No. 15, Aug. 1, 1994, pp. 2488-2496.

Huang, Peiqing, et al., "On-Line Capillary Liquid Chromatagraphy Tandem Mass Spectrometry on an Ion Trap/Reflection Time-of-Flight Mass Spectrometer Using the Sequence Tag Database Search Approach for Peptide Sequencing and Protein Identification," Journal of American Society for Mass Spectrometry, vol. 11, No. 2, Feb. 2000, pp. 127-135.

Doroshenko, Vladimir M., et al., "Matrix-assisted Laser Desportion/Ionization Inside a Quadrupole Ion-trap Detector Cell," Rapid Communications in Mass Spectrometry, vol. 6, (1992), pp. 753-757.

Chambers, David M., et al., "Matrix-Assisted Laser Desportion of Biological Molecules in the Quadrupole Ion Trap Mass Sepctrometer," Analytical Chemistry, 65, 1993, pp. 14-20.

Dawson, J.H.J., et al., "Orthogonal-acceleration Time-of-flight Mass Spectrometer," Rapid Communications in Mass Spectrometry, vol. 3, No. 5, 1989 pp. 155-159.

Chernushevich, Igor V., et al., "Orthogonal Injection TOFMS for Analyzing Biomeolecules," Analytical Chemistry, vol. 71, No.13, Jul. 1, 1999, pp. 452A-461A.

Laiko, Victor V., et al., Atmospheric Pressure MALDI/Ion Trap Mass Spectrometry, Analytical Chemistry, vol. 72, No. 12, Nov. 1, 2000, pp. 5239-5243.

Badman, Ethan R., et al., "Cylindrical Ion Trap Array with Mass Selection by Variation in Trap Dimensions," Analytical Chemistry, 72, No. 20, Oct. 15, 2000, pp. 5079-5086.

Kornienko, Oleg et al., "Micro Ion Trap Mass Spectrometry," Rapid Communications in Mass Spectrometry, Rapid Communications in Mass Spectrometry 13, (1999), pp. 50-53.

He, Ling et al., "Detection of Oligonucleotides by External Injection into an Ion Trap Storage/Reflectron Time-of-flight Device," Rapid Communications in Mass Spectrometry, vo., 11, (1997), pp. 1440-1448.

Doroshenko, Vladimir M. et al., "A Quadrupole Ion Trap/Time-of-Flight Mass Spectrometer with a Parabolic Reflectron," Journal of Mass Spectrometry, vol. 33, (1998), pp. 305-318.

* cited by examiner

COMBINED CHEMICAL/BIOLOGICAL AGENT MASS SPECTROMETER DETECTOR

RELATED APPLICATIONS

This Application is the U.S. National Phase Filing of PCT/US03/10815, filed Apr. 9, 2003, which is based on U.S. Provisional Application No. 60/371,447, filed Apr. 10, 2002, the entire contents of both of which Applications are hereby incorporated by reference.

STATEMENT AS TO RIGHTS TO INVENTIONS MADE UNDER FEDERALLY SPONSORED RESEARCH AND DEVELOPMENT

The present invention was conceived during the course of work supported by grant No. R01 RR08912 from the National Institutes of Health, grant No. DABT163-99-1-0006 and grant No. BAA00-09-013 from DARPA.

BACKGROUND OF THE INVENTION

1. Field of Invention

The present invention relates to a mass spectrometer in general and in particular to a mass spectrometer that combines the use of time-of-flight mass spectrometry and ion-trap mass spectrometry in a single mass spectrometer.

2. Description of Related Art

Mass spectrometers are instruments that are used to determine the chemical composition of substances and the structures of molecules. In general they consist of an ion source where neutral molecules are ionized, a mass analyzer where ions are separated according to their mass/charge ratio, and a detector. Mass analyzers come in a variety of types, including magnetic field (B) instruments, combined electrical and magnetic field or double-focusing instruments (EB or BE), quadrupole electric field (Q) instruments, and time-of-flight (TOF) instruments. In addition, two or more analyzers may be combined in a single instrument to produce tandem (MS/MS) mass spectrometers. These include triple analyzers (EBE), four sector mass spectrometers (EBEB or BEEB), triple quadrupoles (QqQ) and hybrids (such as the EBqQ).

In tandem mass spectrometers, the first mass analyzer is generally used to select a precursor ion from among the ions normally observed in a mass spectrum. Fragmentation is then induced in a region located between the mass analyzers, and the second mass analyzer is used to provide a mass spectrum of the product ions. Tandem mass spectrometers may be utilized for ion structure studies by establishing the relationship between a series of molecular and fragment precursor ions and their products. Alternatively, they are now commonly used to determine the structures of biological molecules in complex mixtures that are not completely fractionated by chromatographic methods. These may include mixtures of, for example, peptides, glycopeptides or glycolipids. In the case of peptides, fragmentation produces information on the amino acid sequence.

One type of mass spectrometers is time-of-flight (TOF) mass spectrometers. The simplest version of a time-of-flight mass spectrometer, illustrated in FIG. 1 (Cotter, Robert J., Time-of-Flight Mass Spectrometry: Instrumentation and Applications in Biological Research, American Chemical Society, Washington, D.C., 1997), the entire contents of which is hereby incorporated by reference, consists of a short source region 10, a longer field-free drift region 12 and a detector 14. Ions are formed and accelerated to their final kinetic energies in the short source region 10 by an electric field defined by voltages on a backing plate 16 and drawout grid 18. Other grids or lenses 17 may be added to the source region to enhance extraction and to improve the mass resolution by reducing the initial velocity distribution. The longer field-free drift region 12 is bounded by drawout grid 18 and an exit grid 20.

In the most common configuration, the drawout grid 18 and exit grid 20 (and therefore the entire drift length) are at ground potential, the voltage on the backing plate 16 is V, and the ions are accelerated in the source region to an energy: $mv^2/2=z\ eV$, where m is the mass of the ion, v is its velocity, e is the charge on an electron, and z is the charge number of the ion. The ions then pass through the drift region 12 and their (approximate) flight time(s) is given by the formula:

$$t=[(m/z)/2\ eV]^{1/2}D \quad \text{(I)}$$

which shows a square root dependence upon mass. Typically, the length 1 of source region 10 is of the order of 0.5 cm, while drift lengths (D) ranges from 15 cm to 8 meters. Accelerating voltages (V) can range from a few hundred volts to 30 kV, and flight time are of the order of 5 to 100 microseconds. Generally, the accelerating voltage is selected to be relatively high in order to minimize the effects on mass resolution arising from initial kinetic energies and to enable the detection of large ions. For example, the accelerating voltage of 20 KV (as illustrated for example in FIG. 1) has been found to be sufficient for detection of masses in excess of 300 kDaltons (kDa).

Mass resolution can be improved by pulsing one or more of the source elements such as the backing plate 16 or the grid 17. Other times-dependent pulses or waveforms may also be applied to the source (Kovtoun, S. V., English, R. D. and Cotter, R. J., Mass Correlated Acceleration in a Reflectron MALDI TOF Mass Spectrometer: An Approach for enhanced Resolution over a Broad Range, J. Amer. Soc. Mass Spectrom. 13 (2002) 135–143).

Mass resolution may also be improved by the addition of a reflectron (Mamyrin, B. A., Karataev, V. I., Shmikk, D. V. Zagulin, V. A. Sov. Phys. JET 37 (1973) 45). A conventional reflectron is essentially a retarding electrical field which decelerates the ions to zero velocity, and allows them to turn around and return along the same or nearly the same path. Ions with higher kinetic energy (velocity) penetrate the reflectron more deeply than those with lower kinetic energy, and thus have a longer path to the detector. Ions retain their initial kinetic energy distributions as they reach the detector; however, ions of different masses will arrive at different times.

An example of a time-of-flight mass spectrometer utilizing a reflectron is shown schematically in FIG. 2 (same numerals in FIG. 1 and FIG. 2 are used to indicate same elements however positioned differently). The reflectron may be single stage or dual-stage. In both single-stage and dual-stage reflectrons, a stack of electrodes 32 (also called ion lenses), each connected resistively to one another, provide constant retarding field regions that are separated by one grid 34 in the single stage reflectron 30. In the most common case, grids and lenses are constructed using ring electrodes. In the case of grid 34 illustrated in FIG. 2, the ring electrode is covered with a thin wire mesh.

In single-stage reflectrons, a single retarding region is used as and (approximate) ion flight times are given by the formula:

$$t=[(m/z)/2\ eV]^{1/2}\ [L_1+L_2+4d] \quad \text{(II)}$$

which has the same square-root dependence expressed in Equation (I). The terms, in addition to those expressed in Equation (I), are L1, L2 and d. L1 and L2 are the lengths of the linear drift regions illustrated in FIG. 2, respectively, in the forward and return directions, and d is the average penetration depth.

While reflectrons were originally intended to improve mass resolution for ions formed in an ion source region, they have more recently been exploited for recording the mass spectra of product ions formed outside the source by metastable decay or by fragmentation induced by collisions with a target gas or surface, or by photodissociation. Ions resulting from the fragmentation of molecular ions in the flight path can be observed at times given by the following formula:

$$t=[(m/z)/2\ eV]^{1/2}\ [L_1+L_2+4(m'/m)d] \quad \text{(III)}$$

where m' is the mass of the new fragment ion. In the case of peptides, these ions can provide amino acid sequences. These ions are generally focused by stepping or scanning the reflectron voltage VR or by using non-linear reflectrons (Cornish, T. J., Cotter, R. J., Non-linear Field Reflectron, U.S. Pat. No. 5,464,985, the entire contents of which is hereby incorporated by reference).

Other types of mass spectrometers include quadrupole mass spectrometers or quadrupole ion trap mass spectrometers. Quadupole ion trap mass spectrometers were first commercialized as detectors for gas chromatography (GC). In these first configurations developed by Finnigan Corporation, the ion trap mass spectrometer 40, shown schematically in FIG. 3, comprises electron impact ion source 42. Gaseous ions were produced from the GC effluent by electron impact ionization using electron source 42 (comprising a filament) and a fundamental radio-frequency 1.1 MHz was imposed on the ring electrode 44. With the end caps 46, 47 held at ground potential, mass spectra were recorded by scanning the amplitude of the fundamental RF frequency, causing the ions to fall out of the trapping field and into detector 48. This method is known as the mass-selective instability mode (Stafford, G. C., Jr., Kelley, P. E., Syka, J. E. P, Reynolds, W. E., Todd, J. F. J., Inter. J. Mass Spectrom. Ion Processes 60 (1984 85–98). However, this method of mass recording has a range of around 750 Da.

The addition of a supplemental radio-frequency (RF) voltage on the end cap electrodes enables resonant ejection of the ions while scanning the fundamental RF amplitude (Louris, J. N., Cooks, R. G., Syka, J. B. P., Kelley, P. E., Stafford, G. C., Jr., Todd, J. F. J., Analytical Chemistry 59 (1987) 1677–1685), This greatly increases the trap's mass range (from 2000 to 4000 Daltons on commercial instruments). In addition to their role in recording mass spectra, high amplitude supplemental waveforms can be used to isolate a specific preselected mass by ejection of all other ions (Louris, J. N., Brodbelt-Lustig, J. S., Cooks, R. G., Glish, G. L., Van Berkel, G. J., McLuckey, S. A., Ion Isolation and Sequential Stages of Mass Spectrometry in a Quadrupole Ion Trap Mass Spectrometer, Int. J. Mass Spect. Ion Processes 92 (1990) 117–137), while lower amplitude excitation can be used to provide repetitive low energy collisions that lead to fragmentation of the precursor mass (Practical Aspects of Ion Trap Mass Spectrometry: Fundamentals of Ion Trap Mass Spectrometry, March, Raymond E., Todd, J. F. J. (Eds.), CRC Press, Boca Raton (1995)). These and other types of excitation can employ both symmetric and non-symmetric waveforms and/or can be generated by stored waveform inverse Fourier transform SWIFT techniques (Soni, M. H., Cooks, R. G., Selective Injection and Isolation of Ions in Quadrupole Ion Trap Mass Spectrometry Using Notched Waveforms Created Using the Inverse Fourier Transform, Anal. Chem. 66 (1994) 2488–2496, and Doroshenko et al. U.S. Pat. No. 5,696,376). They form the basis of an ion trap's ability to perform MS/MS and $MS^n$ measurements.

The increased mass range capability led to the development of instruments with electrospray (Huang, P., Wall, D. B., Parus, S., Lubman, D. M., On-line Capillary Liquid Chromatography Tandem Mass Spectrometry on an Ion Trap/Reflectron Time-of-Flight Mass Spectrometer Using the Sequence Tag Database Search Approach for Peptide Sequencing and Protein Identification, J. Am. Soc. Mass Spectrom. 11 (2000) 127–135) and Matrix-Assisted Laser Desorption/Ionization (MALDI) (Doroshenko, V. M., Cornish, T. J., Cotter, R. J., Matrix-Assisted Laser Desorption/Ionization of Biological Molecules in the Quadrupole Ion Trap Mass Spectrometer, Anal. Chem. 65 (1993) 14–20). In these instruments, ions are formed outside the trap and various methods, including collisional cooling by an inert gas such as helium and dynamic gating of the fundamental trapping field (Doroshenko, V. M., Cotter, R. J., U.S. Pat. No. 5,399,857) were used to capture ions injected into the trap.

In the matrix-assisted laser desorption/ionization (MALDI) method, biomolecules to be analyzed are recrystallized in a solid matrix of a low mass chromophore. Following absorption of the laser radiation by the matrix, ionization of the analyte molecules occurs as a result of desorption and subsequent charge exchange processes. An ion trap mass spectrometer with a MALDI ion source is illustrated in FIG. 4. An ion trap mass spectrometer with MALDI 50 includes sample plate 52 and pulsed laser radiation 54 which is used to desorb and ionize the molecules under study. The ionic molecules are trapped and mass analyzed by ion trap mass spectrometer 56. Unlike TOF spectrometers, the mass measurement is not particularly sensitive to the ion's initial kinetic energy. The sample plate 52 is biased at a voltage sufficient to move the ions into the trap. The biasing voltage is generally considerably lower than the voltage used in TOF instruments. In the ion trap mass spectrometer/MALDI 50, pulsed extraction is not required for mass resolution since resonant frequency, not time, is the basis for mass ejection into detector 58.

The ion trap mass spectrometer-MALDI 50 allows obtaining MS/MS spectra for peptide molecular ions formed by MALDI. An MS/MS spectrum of an ovalbumin tryptic fragment is shown in FIG. 5. Although not all of the possible ions required for amino acid sequencing are observed, the eight ions indicated in FIG. 5 provide sequence tags that could be utilized in the identification of the peptide and its species of origin from a database.

Though ion traps are relatively small size instruments, interest in miniaturization of these mass analyzers has led to the development of cylindrical geometries (Badman, E. R., Cooks, R. G., Cylindrical Ion Trap Array with Mass Selection by Variation in Trap Dimensions, Anal. Chem. 72 (2000) 5079–5086 and Kornienko, O., Reilly, P. T. A., Whitten, W. B., Ramsey, J. M., Micro Ion Trap Mass Spectrometry, Rapid Commun. Mass Spectrom. 13 (1999) 50–53). A simplified geometry 60 shown in FIG. 6 makes it possible to construct multiple mass analyzers machined into a single assembly constructed from three parallel stainless steel plates 62, 63 and 64. The plates 62 and 64 play the role of end cap electrodes while the plate 63 plays the role of the radio-frequency ring electrode.

Hybrid instruments have also been developed using both ion trap and time-of-flight mass analyzers in tandem (He, L., Liu, Y.-H., Zhu, Y. Lubman, D. M., Detection of Oligonucleotides by External Injection into an Ion Trap Storage/Reflectron Time-of-Flight Mass Spectrometer, Rapid Commun. Mass Spectrom. 11 (1997) 1440–1448 and Doroshenko, V. M., Cotter, R. J., A Quadrupole Ion Trap/Time of-Flight Mass Spectrometer with a Parabolic Reflectron, J. Mass Spectrom. 33 (1998) 305–318). An example of such hybrid instruments is shown in FIG. 7. Hybrid mass spectrometer 70 comprises ion trap 72 and time-of-flight mass analyzer 74. The ion trap 72 is the first mass analyzer, which is used to trap ions, select a precursor, and induce fragmentation through the application of supplemental RF and collisions with a background gas (e.g., helium). The product ions are then mass analyzed by time-of-flight with TOF mass spectrometer 74. R. M. Jordan, Kratos Analytical and Syagen have commercialized ion trap/TOF tandem instruments. These instruments are capable of carrying out $MS^n$ cycles, where the last cycle is always recorded by a time-of-flight mass measurement. In these instruments, however, the mass range is determined by the highest mass that can be trapped in the ion trap 72 which may be from 2000 to 20000 Da.

SUMMARY OF THE INVENTION

An aspect of the present invention is to provide a mass spectrometer including an ion source, a detector arranged spaced apart from the ion source, a first end cap electrode arranged proximate to the ion source, a second end cap electrode arranged proximate the detector, and a ring electrode arranged between the first and the second end cap electrodes. The ring electrode in the mass spectrometer is selectively connectable to either a radio-frequency voltage source or a constant voltage source. When the ring electrode is connected to the radio-frequency voltage source the first end cap, the second end cap and the ring electrode form an ion trap and the mass spectrometer operates as an ion trap mass spectrometer. When the ring electrode is connected to a constant voltage the mass spectrometer operates as a time-of-flight mass spectrometer.

In an embodiment, the ion source includes a sample plate and a source of ionizing energy. The ion source further includes an extraction electrode disposed proximate the sample plate. The source of ionizing energy can be, for example, any one of a laser, an electron beam source, a source of an energetic ion beam, a source of an energetic atom beam, or a radio-frequency voltage source.

In an embodiment, the extraction electrode can include a grid electrode held at a voltage relative to the sample plate such that ions formed in the sample plate are extracted from the sample plate and directed toward an opening in the first end cap electrode.

In an embodiment, the first end cap electrode and the second end cap electrode are held at one of a constant voltage when the mass spectrometer operates as the time-of-flight mass spectrometer, and the first end cap electrode and the second end cap electrode are connected to a radio-frequency voltage source when the mass spectrometer operates as an ion trap mass spectrometer.

In an embodiment, the sample plate is held at a sample voltage and the sample voltage is a voltage selected, for example, with a magnitude between about 10 to 500 volts when said mass spectrometer operates as an ion trap mass spectrometer, and the sample voltage is a voltage selected, for example, with a magnitude between about 1 kilovolt to 50 kilovolts when said mass spectrometer operates as a time-of-flight mass spectrometer. The sample voltage can be also pulsed to provide focusing of ions formed in the ion source.

In an embodiment, the extraction electrode is held at an extraction voltage and the extraction voltage is a voltage selected, for example, with a magnitude between about 10 to 500 volts when the mass spectrometer operates as an ion trap mass spectrometer, and the extraction voltage is a voltage selected, for example, with a magnitude between about 1 kilovolt to 50 kilovolts when the mass spectrometer operates as a time-of-flight mass spectrometer.

The first end cap electrode and/or the second end cap electrode are, for example, provided with a hyperboloid shaped surface or a cylindrical shaped surface. The ring electrode can also be provided with a surface having a hyperboloid shape.

In an embodiment, the detector can include a channeltron, an electron multiplier, or a microchannel plate assembly. The detector is arranged to intercept particles to be measured.

Another aspect of the present invention is to provide a method for identifying biomolecules with a mass spectrometer. The method includes ionizing the biomolecules with an ionizer to obtain a plurality of ions, analyzing masses of the ions with the mass spectrometer in a time-of-flight mode, switching said mass spectrometer to operate in an ion trap mode, and analyzing fragment masses of at least ions of one mass in the plurality of ions.

BRIEF DESCRIPTION OF THE DRAWINGS

These and other objects and features of the invention will become more apparent and more readily appreciated from the following detailed description of the presently preferred exemplary embodiments of the invention, taken in conjunction with the accompanying drawings, of which.

DETAILED DESCRIPTION OF SEVERAL EXEMPLARY EMBODIMENTS OF THE INVENTION

In the present invention, the masses of the ions are measured either by ion trap or time-of-flight analysis. This allows one to, among other things, exploit the maximum mass range while providing MS/MS and $MS^n$ capabilities for ions within a specific mass range for which fragmentation can be induced. Moreover, this invention provides mass analysis in two different modes, i.e. ion trap and time-of-flight, in a single mass spectrometer. In other words, the present invention allows one to use the same set of electrodes, ion extraction, focusing element(s) and ion detector as either an ion trap type of mass spectrometer or as a time-of-flight type of mass spectrometer.

Figure 1:
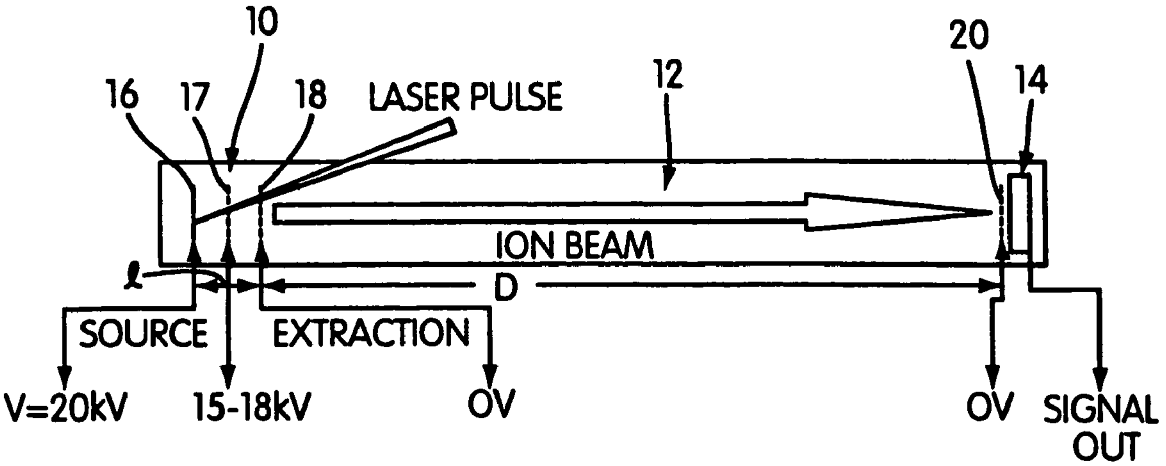
FIG. 1 PRIOR ART
FIG. 1 is a schematic representation of a conventional time-of-flight spectrometer.
Figure 2:
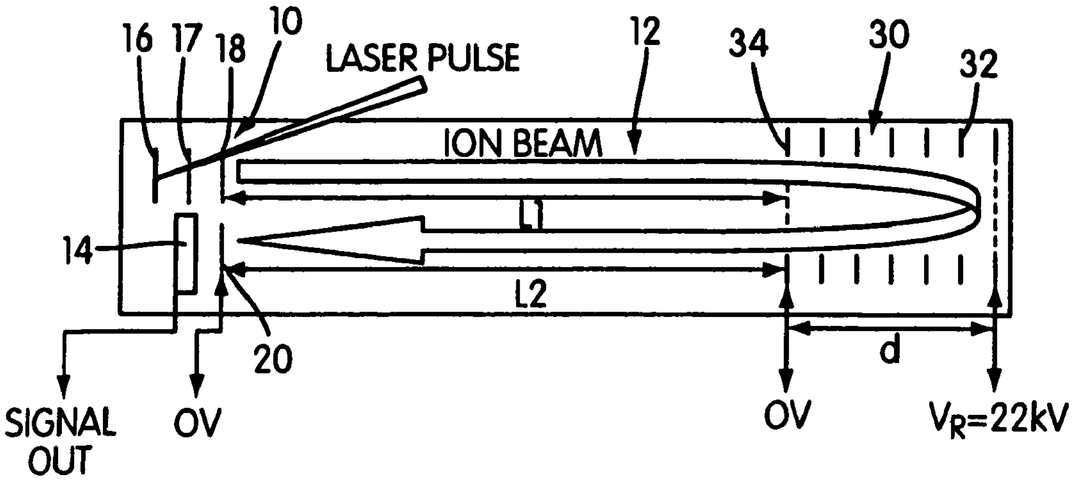
FIG. 2 PRIOR ART
FIG. 2 is schematic representation of a conventional time-of-flight spectrometer using a reflectron.
Figure 3:
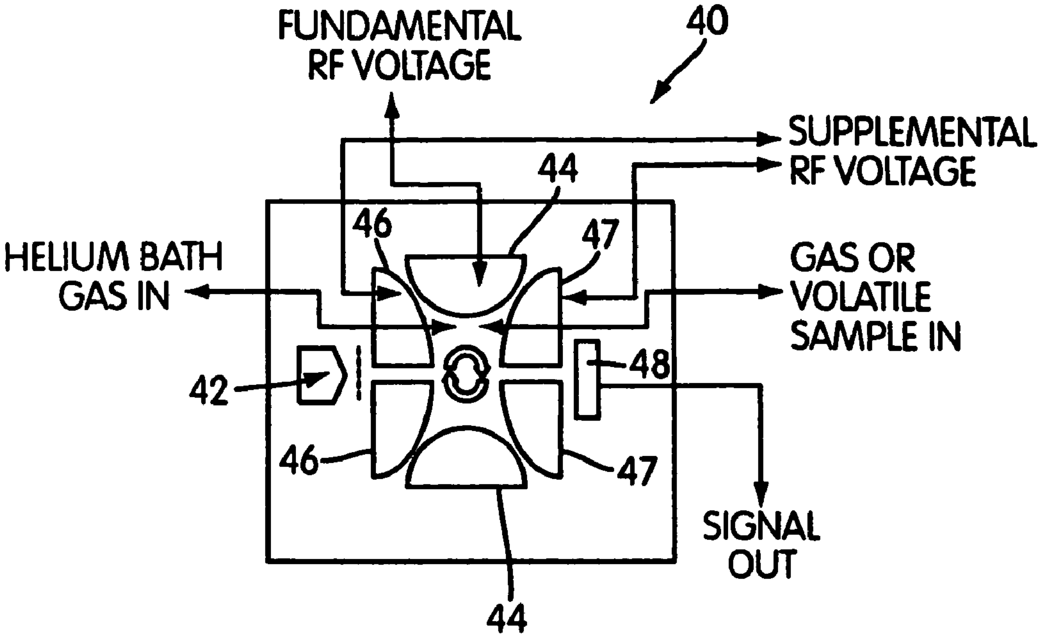
FIG.3 PRIOR ART
FIG. 3 is a schematic representation of a conventional ion trap mass spectrometer using an electron impact ion source.
Figure 4:
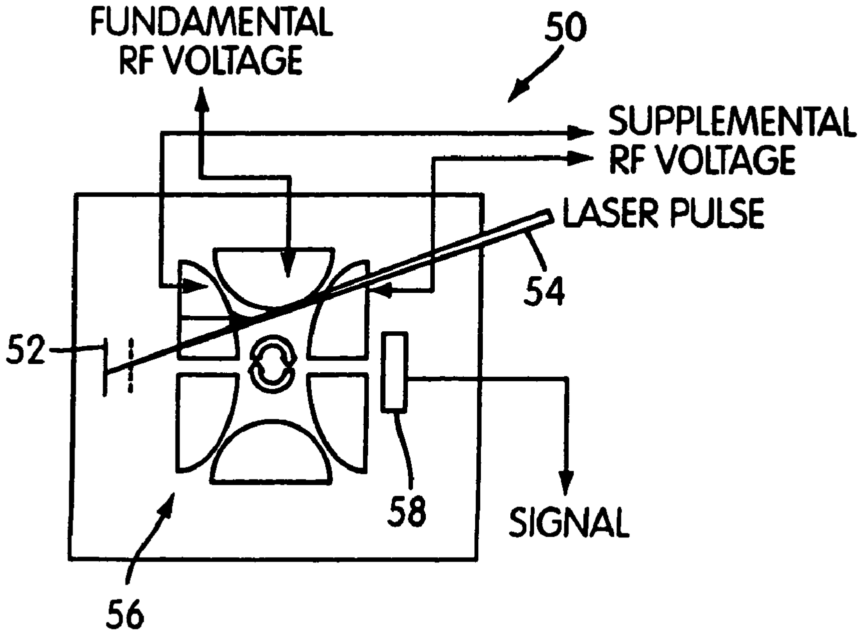
FIG.4 PRIOR ART
FIG. 4 is a schematic representation of a conventional ion trap mass spectrometer using a matrix-assisted laser desorption ionization source.
Figure 5:
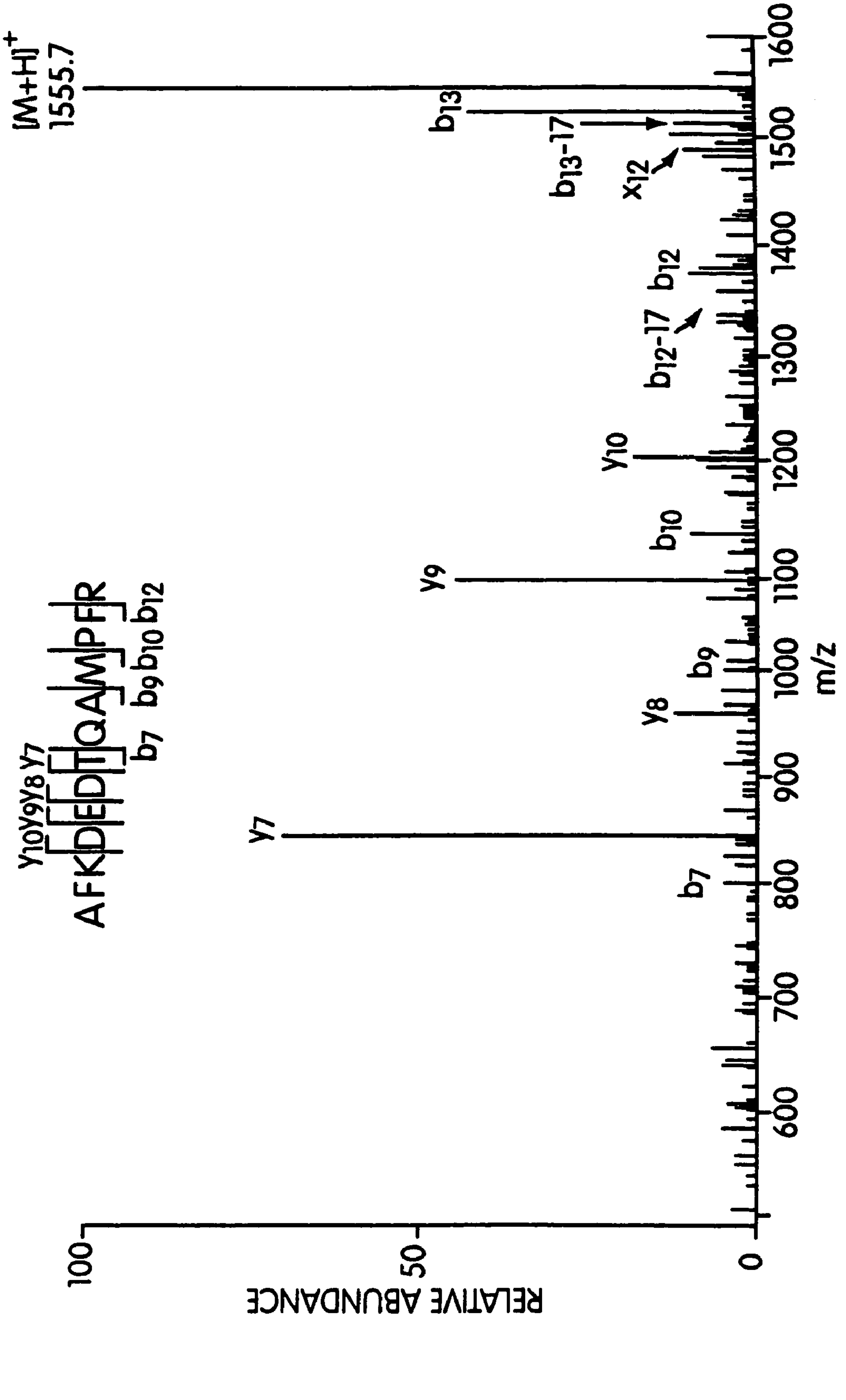
FIG. 5 PRIOR ART
FIG. 5 is an example of a MS/MS spectrum obtained by an ion trap mass spectrometer with a matrix assisted laser desorption ionization source.
Figure 6:
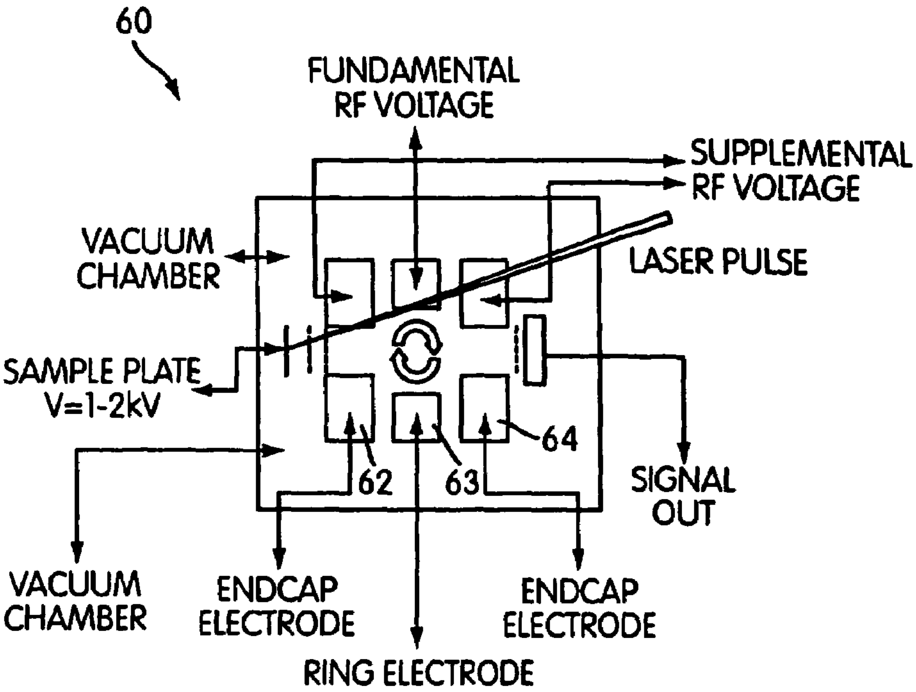
FIG. 6 PRIOR ART
FIG. 6 is a schematic representation of a conventional ion trap mass spectrometer using cylindrical geometry electrodes.
Figure 7:
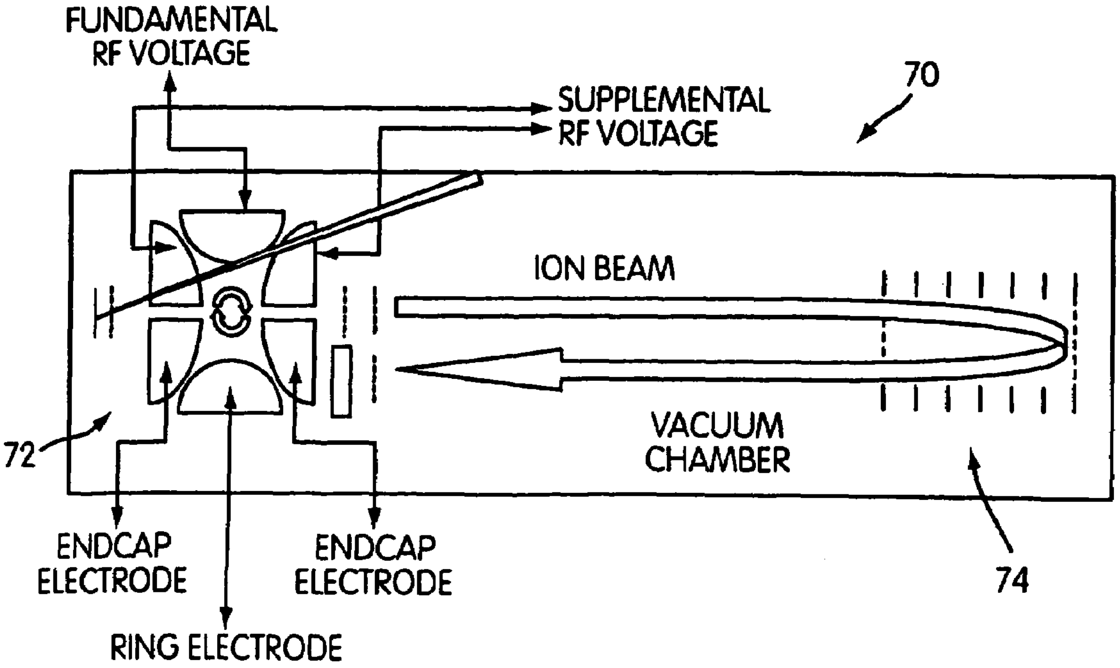
FIG. 7 PRIOR ART
FIG. 7 is a schematic representation of a hybrid mass spectrometer using a ion trap mass spectrometer and a time-of-flight mass spectrometer in series.
Figure 8:
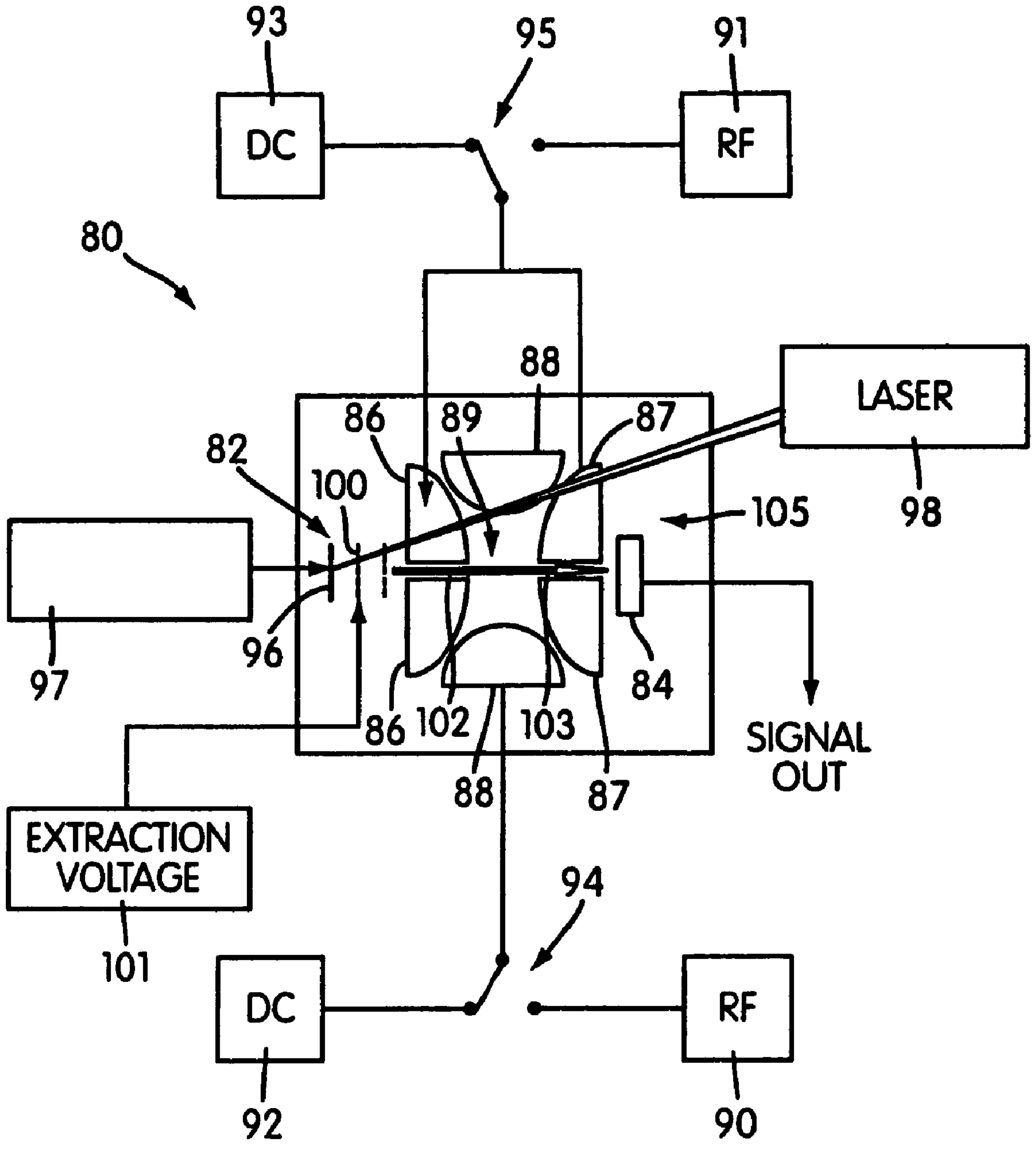
FIG. 8 is a schematic representation of one embodiment of a mass spectrometer according to the present invention.

One embodiment of a mass spectrometer according to the present invention is shown in FIG. 8. Mass spectrometer 80 comprises ion source 82, ion detector 84, a first end cap electrode 86 arranged proximate to ion source 82, and a second end cap electrode 87 arranged proximate detector 84. The mass spectrometer 80 further comprises a ring electrode 88 arranged between the first end cap electrode 86 and the second end cap electrode 87. The ring electrode 88 may be connected to either a radio-frequency voltage source 90 or to a constant voltage source 92 by using electrical switch 94. In the same fashion, the first end cap electrode 86 and second end cap electrode 87 may be selectively connected to either a supplemental radio-frequency voltage source 91 or to constant voltage source 93 using electrical switch 95.

When the ring electrode 88 is connected to fundamental radio-frequency voltage source 90, the first end cap 86, the second end cap 87 and the ring electrode 88 form an ion trap 89 and the mass spectrometer operates as ion trap mass spectrometer. In this operating mode, the first end cap electrode 86 and the second end cap electrode 87 may be connected to supplemental radio-frequency voltage source 91. Application of a supplemental radio-frequency voltage to end cap electrodes 86 and 87 provides additional control of the ions trajectory in the ion trap operating mode.

Alternatively, when the ring electrode 88 is connected to the constant voltage source 92, the mass spectrometer 80 operates as a time-of-flight mass spectrometer, as illustrated in FIG. 8. In this mode of operation, first end cap electrode 86 and second end cap electrode 87 are maintained at a constant voltage substantially equal to the constant voltage applied to ring electrode 88 by electrically connecting the first end cap electrode 86 and the second end cap electrode 87 to constant voltage source 93. In this way, a field-free zone is maintained between first end cap electrode 86 and second end cap electrode 87 to allow free travel of ions in that region.

The ion source 82 comprises a sample plate 96 and an ionizing source 98. The sample plate 96 holds a sample of material (not shown) being mass analyzed. The sample plate can be a simple sample probe, a more complex sample array with a movable stage, or other mechanisms allowing placement of the sample. Alternatively, instead of providing a movable stage, the ring electrode, end cap electrodes, other electrodes anti optionally the detector can be arranged to move together relative to the sample stage which is held at a fixed position. Exemplary systems are described in a Provisional Application No. 60/371,443 of Cotter et al., the entire contents of which are incorporated herein by reference and co-pending commonly assigned U.S. Patent application publication 2005/0173627 A1 of Cotter et al. entitled "Miniaturized Sample Scanning Mass Analyzer," the entire contents of which are incorporated herein by reference. The sample material can be for example a chemical agent or a biomolecule such as DNA. In the time-of-flight mode, as illustrated in FIG. 8. the sample plate is biased at relatively high voltage, for example, 20 kV using sample plate voltage source 97. In ion trap mode, however, the sample plate 96 is biased at relatively low voltage, for example, 100 V sufficient to "push" the ions inside the ion trap 89 as will be explained further in the following paragraphs.

The ionizing source 98 can be any radiation source, such as a laser radiation source, as shown in FIG. 8, an electron beam source (as shown for example in FIG. 10A), an ion source, or a fast (energetic) atom source. A laser radiation source is well suited for Matrix Assisted Laser Desorption Ionization. In an electron beam source, the ions are generated via electron impact with the sample material. Similarly, the ions to be analyzed can also be generated through ion collisional processes of an ion beam with the sample of material, i.e. through ion-molecule collisions. The ionizing source 98 can also be a plasmatron, i.e. a plasma discharge ion source which can, for example, use radio-frequency to induce ionization and formation of ions in the sample material (this technique is well suited for mass analysis of chemical agents having a relatively small molecular size).

The ion source 82 may further include extraction electrode(s) 100 disposed proximate the sample plate 96. The extraction electrode 100 includes a grid electrode held at a potential relative to the sample plate 96 such that ions formed in the sample plate 96 region are extracted and directed toward opening 102 in the first cap electrode 86.

In the time-of-flight spectrometer mode, as shown for example in FIG. 8, the extraction electrode 100 is held at, for example, a potential of 15 kV to 18 kV using extraction voltage generator 101. If the potential at the sample plate 96 is 20 kV, the difference of potential between the extraction electrode 100 and the sample plate 96 is 2 kV to 5 kV.

The sample plate voltage source 97 or the extraction voltage source can be pulsed. Pulsing the sample voltage source or the extraction voltage source allows one to achieve better focusing of the ions. Various pulsing schemes exist, that includes several variations of voltage waveforms (e.g., linear, exponential) as well as adjusting the delay time of the voltage pulse relative to the laser pulse (in MALDI). Exemplary pulsing ion extraction methods have been described in a commonly assigned U.S. Pat. No. 6,518,568, the entire contents of which are incorporated herein by reference.

In the ion trap spectrometer mode, the sample plate is generally held at a substantially lower potential than in the case of TOF spectrometer mode, for example, around 100 V and the extraction electrode playing the role of a gate is also held initially at some low voltage. The gate 100 is pulsed during the trapping cycle to move the ions into the ion trap 89. The rise time of voltage pulse at the gate 100 is not critical in this mode, since it does not perform a focusing function as in the case of pulsed extraction methods used in time-of-flight mass spectrometers.

During operation, the mass spectrometer 80 is enclosed inside vacuum chamber 105 to allow collisionless movement of ions formed in ion source 82. The vacuum chamber 105 is pumped and pressure is kept below $5\times10^{-7}$ Torr.

In this embodiment, the first end cap electrode 86 and the second end cap electrode 87 are shown having hyperboloid surfaces. First end cap electrode 86 and second end cap electrode 87 are both substantially disk-shaped with the hyperboloid surface protruding therefrom. The end cap electrodes 86 and 87 are made of stainless steel or a like conductive material. Each of the end cap electrodes 86 and 87 have an opening therethrough. The end cap electrode 86 has opening 102 configured and arranged to allow ions formed in the ion source 82 to travel into the region between the first end cap electrode and second end cap electrode 87. The second end cap electrode 87 has an opening 103 configured and arranged to allow the ions in the region between the first and second electrodes 86 and 87 to exit that region and travel to detector 84.

The ring electrode 88 is made of stainless steel or the like similar to end cap electrodes 86 and 87. The ring electrode 88 is substantially doughnut-shaped and has an inner parabolic surface. A more detailed description of the ring electrode and the end cap electrodes is given in a commonly assigned U.S. Pat. No. 5,399,857, the entire contents of which are incorporated herein by reference.

The detector 84 can be selected from any commercially available charged particles detector. Such detectors include, but are not limited to, an electron multiplier, a channeltron or a micro-channel plate (MCP) assembly. An electron multiplier is a discrete dynode with a series of curved plates facing each other but shifted from each such that an ion striking one plate creates secondary electrons and an effect of electron avalanche follows through the series of plates. A channeltron is a horn-like shaped continuous dynode structure that is coated on the inside with an electron emissive material. An ion striking the channeltron creates secondary electrons that have an avalanche effect to create more secondary electrons and finally a current pulse. A microchannel plate is made of a leaded-glass disc that contains thousands or millions of tiny pores etched into it. The inner surface of each pore is coated to facilitate releasing multiple secondary electrons when struck by an energetic electron or ion. When an energetic particle such as an ion strikes the material near the entrance to a pore and releases an electron, the electron accelerates deeper into the pore striking the wall thereby releasing many secondary electrons and thus creating an avalanche of electrons.

The detected electron signal corresponding to an ion striking the detector is further amplified, integrated, digitized and recorded into a memory for later analysis and/or displayed through a graphical interface for evaluation. An example for a detection method is disclosed in a commonly assigned U.S. Pat. No. 5,572,025, the entire contents of which are incorporated herein by reference.

The mass spectrometer 80 when operating in a time-of-flight mode consists of detecting the arrival of the ions at the detector 84 and measuring their time-of-flight in reference to firing the laser pulse or the application of a voltage pulse to the sample plate or extraction electrode. The voltage pulse applied to the sample plate or extraction electrode is usually delayed relative the laser pulse to increase efficiency of ion extraction. Since, as explained above, the time-of-flight is proportional to the square root of the mass of the ions, knowing the time-of-flight allows the determination of the mass of the ions and thus the identification of the ions.

When operating in ion trap mode, the mass spectrometer 80 consists of ejection of trapped ions by mass selective instability during scanning the fundamental radio-frequency amplitude by varying voltage source 90, while the end cap electrodes 86 and 87 are held at ground potential, and detecting the arrival of the ions at detector 84 at different radio-frequency amplitudes. Another technique of mass analysis involves the addition of a supplemental radio-frequency (RF) voltage, via RF voltage source 91, on the end cap electrodes 86 and 87 and thus enabling resonant ejection of the ions while scanning the fundamental RF amplitude. This method greatly increases the ion trap's mass range.

In addition to their role in recording mass spectra, high amplitude supplemental waveforms, provided by RF source 91, can be used to isolate a specific preselected mass by ejection of all other ions, while lower amplitude excitation can be used to provide repetitive low energy collisions with a gas, such as helium, leading to fragmentation of a precursor mass. Successive cycles of ion isolation, low amplitude supplemental RF excitation and collisions will produce MS/MS and $MS^n$ spectra from which sequence tags specific to peptides from microorganism can be extracted.

Consequently, mass spectrometer 80 provides both high mass range fingerprint spectra via time-of-flight mass spectrometry mode and amino acid sequence data via ion trap mass spectrometry mode. This is performed through simple changes in the potentials applied to the various electrodes, such as ring electrode 88 and end cap electrodes 86 and 87, in the mass spectrometer 80.

Figure 9:
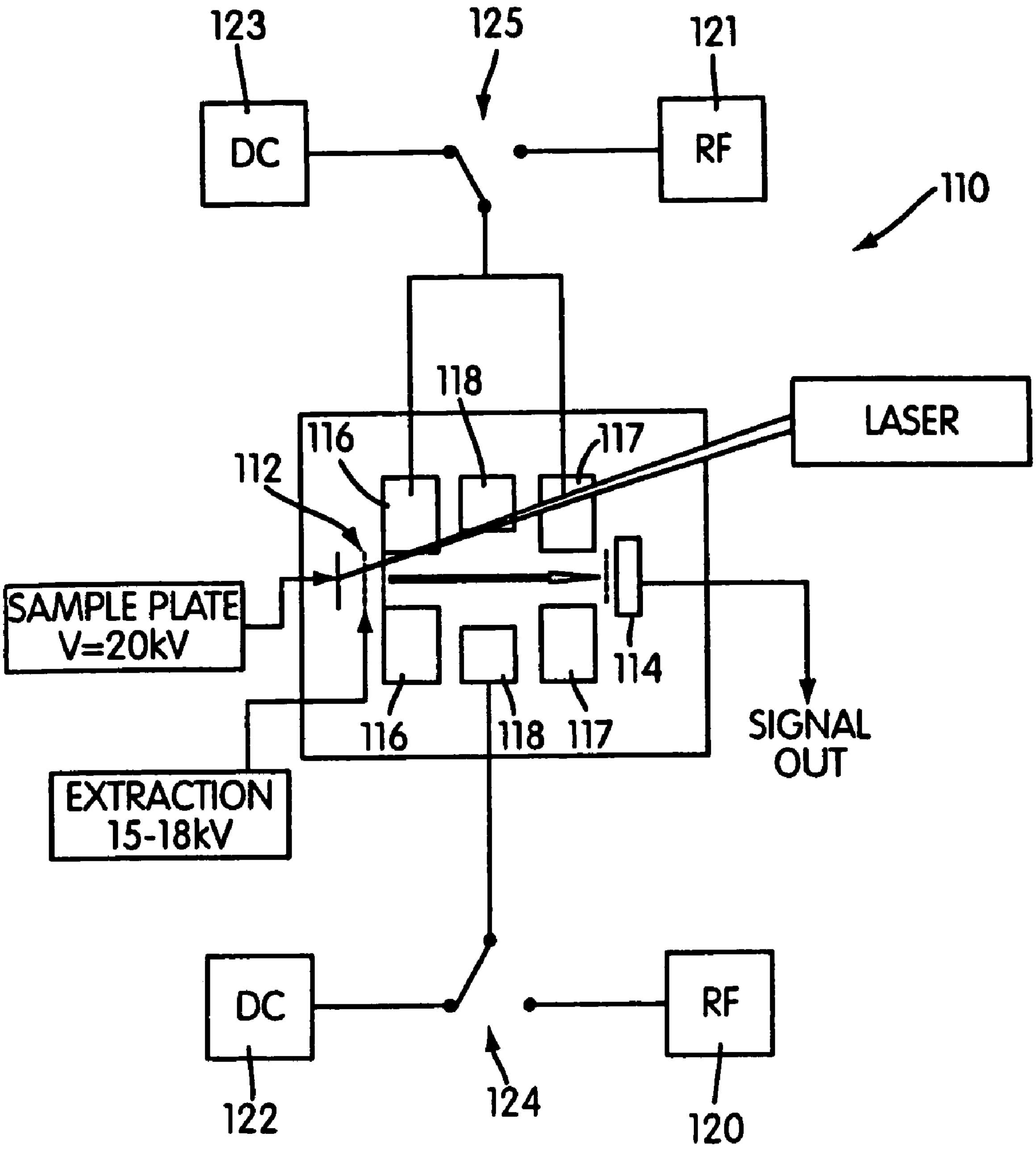
FIG. 9 is a schematic representation of an embodiment of a mass spectrometer according to the present invention.

FIG. 9 shows a mass spectrometer according to an alternative embodiment of the present invention. Mass spectrometer 110 comprises similar elements as mass spectrometer 80. Specifically, mass spectrometer 110 includes ion source 112, ion detector 114, a first end cap electrode 116 arranged proximate to ion source 112, and a second end cap electrode 117 arranged proximate detector 114. The mass spectrometer 110 further includes a ring electrode 118 arranged between the first end cap electrode 116 and the second end cap electrode 117. The ring electrode 118 may be connected to either a radio-frequency voltage source 120 or to a constant voltage source 122 by using electrical switch 124. In the same fashion, the first end cap electrode 116 and second end cap electrode 117 may be selectively connected to either a supplemental radio-frequency voltage source 121 or to constant voltage source 123 using electrical switch 125.

As explained above, connecting selectively each electrode to a specific potential (voltage) allows selecting the mode of operation of the mass spectrometer 110 either in a time-of-flight mass spectrometry mode or in ion trap mass spectrometry mode.

The difference between the mass spectrometer 110 and mass spectrometer 80 is in the geometry or shape of the ring electrode 118 and end cap electrodes 116 and 117. In this embodiment, the first end cap electrode 116, the second end cap electrode 117 and ring electrode 118 are shown having a cylindrical geometry. This geometrical configuration of the electrodes allows further miniaturization of the mass spectrometer 110.

The present invention can be further appreciated from the following examples of operation and their application in the analysis of chemical and biological agents.

Figure 10A:
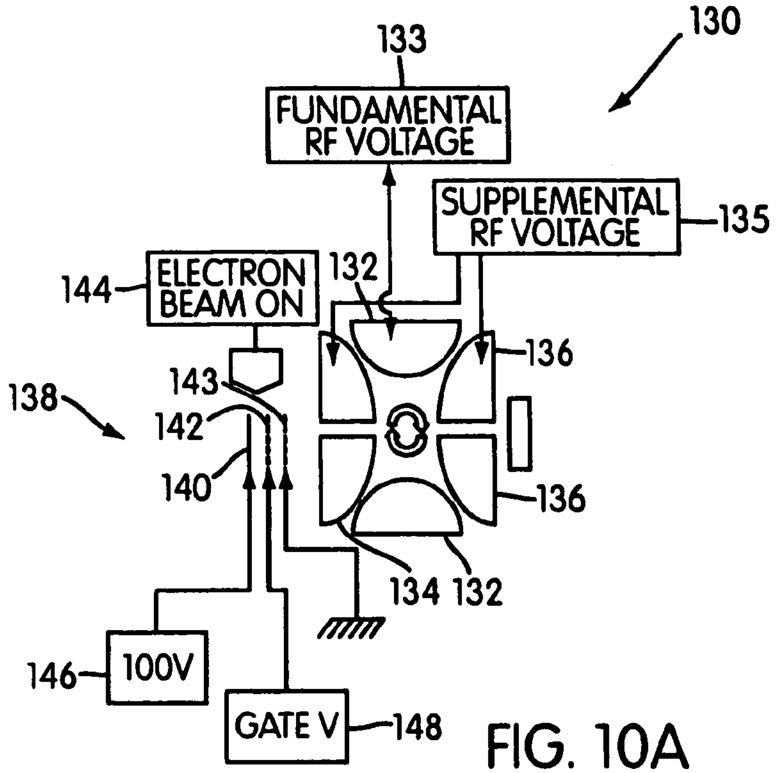
FIG. 10A is a schematic representation of an embodiment of a mass spectrometer using an electron impact ionization source and operating in ion trap mass spectrometer mode according to the present invention.
Figure 10B:
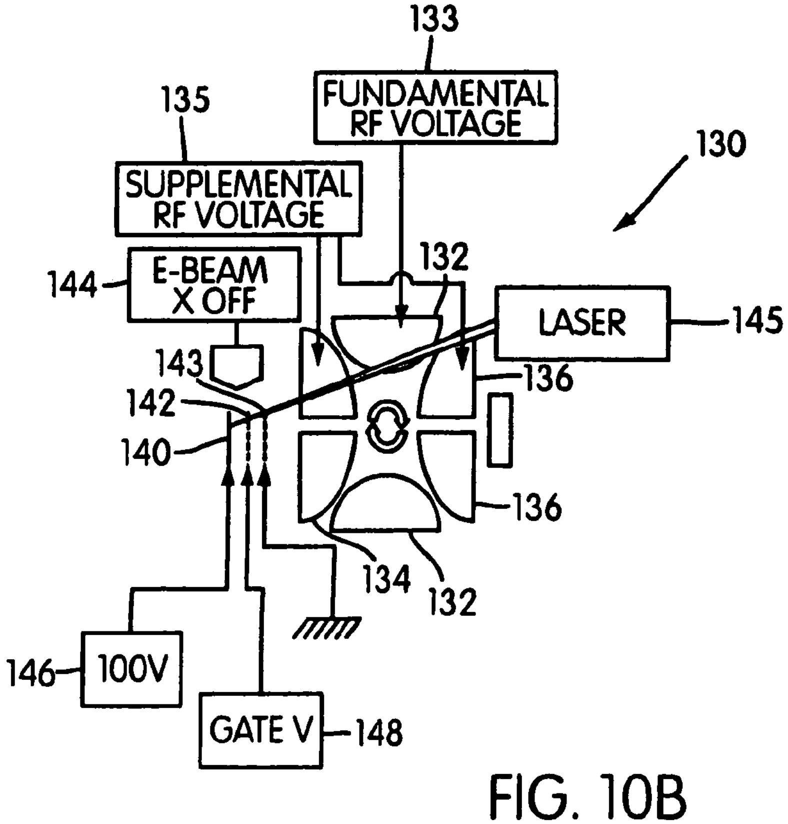
FIG. 10B is a schematic representation of an embodiment of a mass spectrometer using a matrix assisted laser desorption ionization source and operating in ion trap mass spectrometer mode according to the present invention.

FIGS. 10A and 10B show an embodiment of a mass spectrometer according to yet another embodiment of the invention. Similarly to mass spectrometer 80, mass spectrometer 130 includes ring electrode 132, first end cap electrode 134 and second end cap electrode 136. Mass spectrometer 130 is shown operating in the ion trap mass spectrometry mode. In this mode of operation, the ring electrode 132 is connected to radio-frequency voltage source 133 and the first end cap electrode 136 and second end cap electrode 137 are connected to a supplemental radio-frequency voltage source 135.

Mass spectrometer 130 further includes ion source 138 which comprises sample plate 140, gate electrode 142, ground electrode 143 and ionizing source 144. In the embodiment shown in FIG. 10A, ionizing source 144 is an electron beam source. The electron beam source is well suited for ionizing relatively small molecules for chemical mass analysis.

In this embodiment, the filament used to generate the beam of electrons is not in line with the ion trap entrance, and the electron beam is perpendicular to the ion direction. The sample plate comprising the material being analyzed is shown biased at a potential of 100V with sample plate voltage source 146. The gate electrode 142 is held at some lower voltage using gate voltage source 148 in order to extract the ions formed by electron bombardment of the sample material. The ground electrode 143 is connected to ground. The filament (not shown) is biased with respect to the sample plate voltage, generally to provide ionization at 70 eV consistent with most published databases.

The gate voltage source 148 is pulsed during the trapping cycle to move the ions into the trap, i.e. in the region between the first end cap electrode 136 and second end cap electrode 138. The rise time of the gate is not critical in this ion trap mode because, as stated in the above paragraphs, the gate electrode does not perform a focusing function as in the case of pulsed extraction methods used in time-of-flight mass spectrometer.

In the embodiment shown in FIG. 10B, the ionizing source is a laser 145. The electron beam source 144 is turned off in this case. This ionization method is used in MALDI which is well suited for the mass analysis of biomolecules. Because MALDI forms ions within a very short time period (generally 100 ps to 10 ns) the gate is not required to inject ions only during the trapping cycle. Alternatively, a high repetition rate laser running continuously may be utilized, with the gate admitting ions from several laser pulses during several milliseconds trapping cycle. Singly charged ions, with masses below an upper mass limit of the trap, are trapped. Ion selection in the trap can be performed by tuning one of the fundamental RF frequency or the supplemental RF voltage to isolate a specific preselected mass by ejection of all other ions. Fragmentation of the selected ion mass is induced inside the ion trap by collisions with a background gas such as helium injected in the mass spectrometer. Successive cycles of ion isolation, low amplitude RF excitation and collisions will produce MS/MS and $MS^n$ spectra and sequence tags specific to peptides from microorganism can be extracted.

Figure 11A:
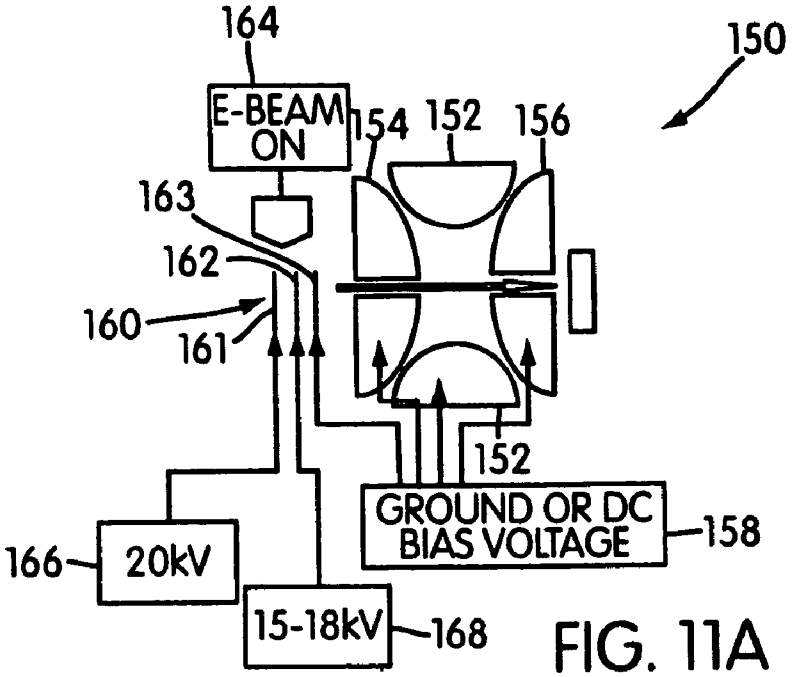
FIG. 11A is a schematic representation of an embodiment of a mass spectrometer using an electron impact ionization source and operating in time-of-flight mass spectrometer mode according to the present invention.
Figure 11B:
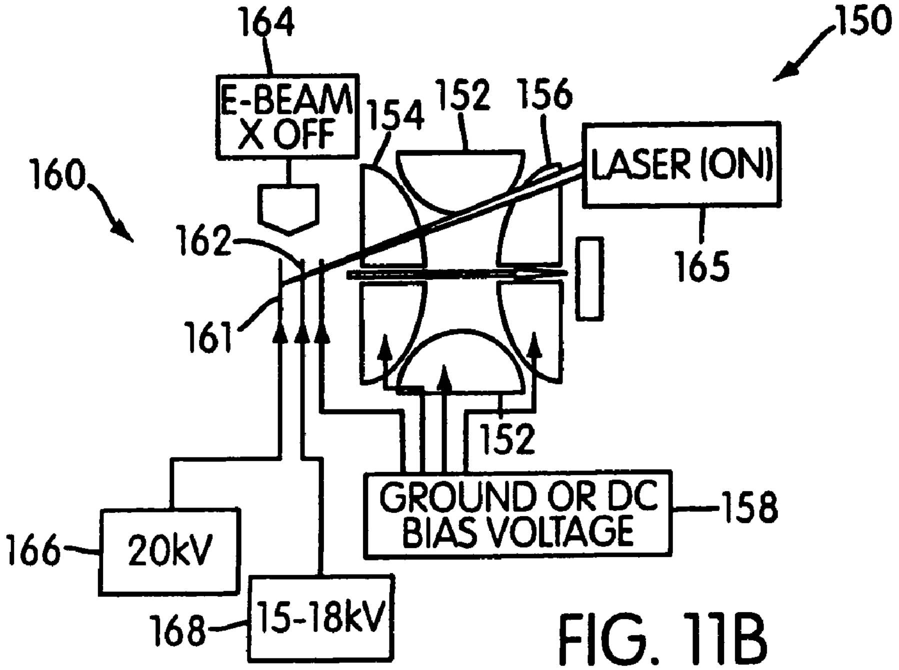
FIG. 11B is a schematic representation of an embodiment of a mass spectrometer using a matrix assisted laser desorption ionization source and operating in time-of-flight mass spectrometer mode according to the present invention.

FIGS. 11A and 11B show an embodiment of a mass spectrometer according to another embodiment of the invention. Similarly to mass spectrometer 80, mass spectrometer 150 includes ring electrode 152, first end cap electrode 154 and second end cap electrode 156. Mass spectrometer 150 is shown operating in the time-of-flight mass spectrometry mode. In this mode of operation, the ring electrode 152, and the end cap electrodes 154 and 156 are connected to voltage source 158 and maintained at some low DC voltage or connected to the ground.

Mass spectrometer 150 further includes ion source 160 which comprises sample plate 161, extraction electrode 162, DC electrode 163 and ionizing source 164. In the embodiment shown in FIG. 11A, ionizing source 164 consists of an electron beam source. The electron beam source is well suited for ionizing relatively small molecules for chemical mass analysis.

The sample plate holding the material being analyzed is shown biased at a potential of 20 kV with sample plate voltage source 166. However, other potentials can be also selected and are within the scope of the present invention. The extraction electrode 162 is held at a lower potential than the sample plate using extraction voltage source 168 in order to extract the ions formed by electron bombardment of the sample material. In this instance, the extraction electrode 162 is held at a potential of 15 kV to 18 kV. The extraction electrode 162 maybe pulsed to provide better focusing of the ions. The DC electrode 163 is either connected to the ground or connected to the same DC voltage equal to the potential in ring electrode 152 and, end cap electrodes 154 and 156 to maintain an equipotential between the end cap electrode 154 and end cap electrode 156. The filament (not shown) is biased with respect to sample plate, generally to provide ionization at 70 eV consistent with most published databases.

In the embodiment shown in FIG. 11B, the ionizing source is a laser 165. The electron beam source 164 is turned off in this case. This ionization method is used in MALDI, which is well suited for the mass analysis of biomolecules.

Figure 12:
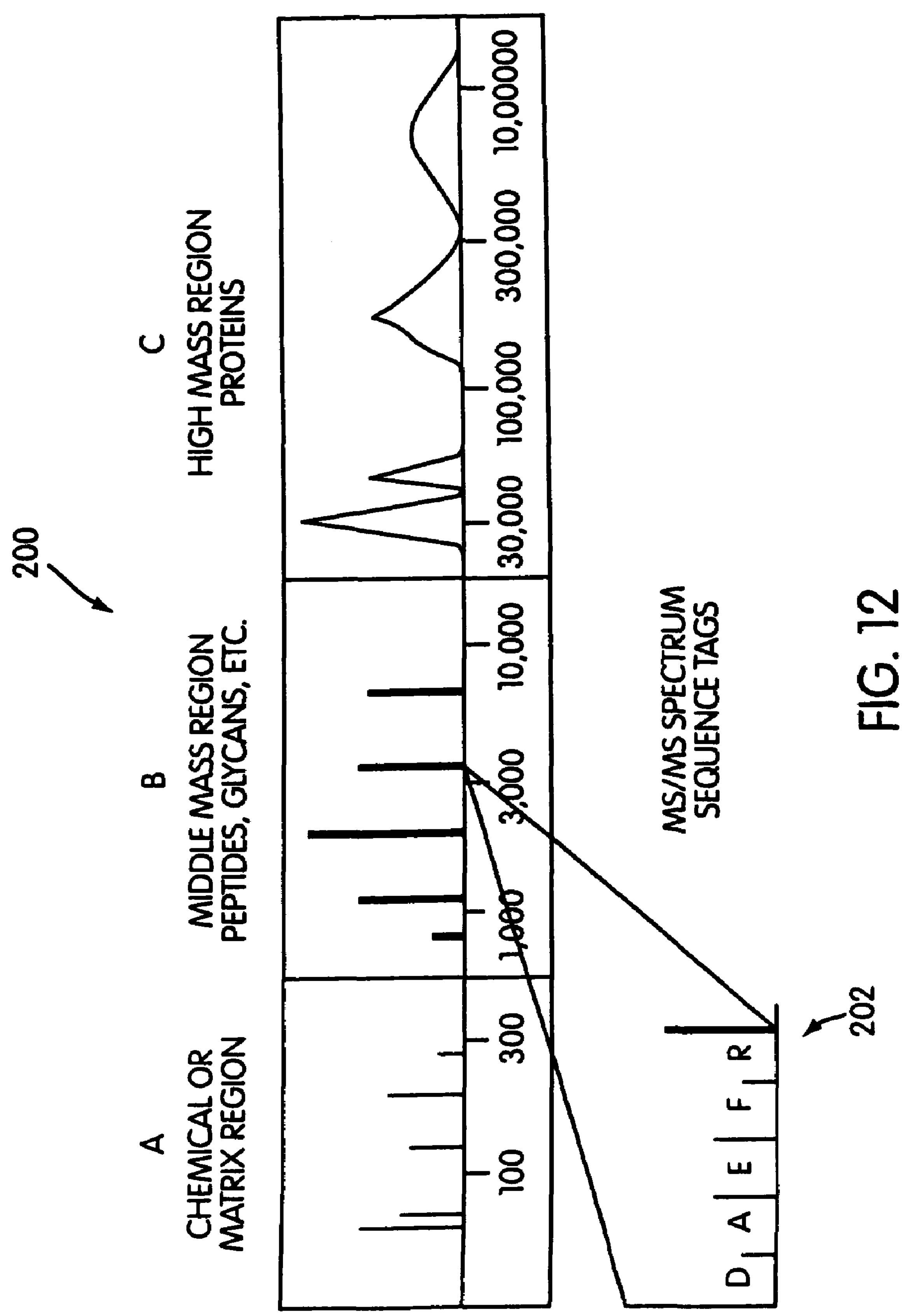
FIG. 12 shows exemplary mass spectra that can be obtained using the mass spectrometer of the present invention.

FIG. 12 shows examples of mass spectra that can be obtained using the mass spectrometer of the present invention. Mass spectrum 200 may be obtained using the mass spectrometer of the present invention used in time-of-flight mode while mass spectrum 202 is obtained using the mass spectrometer of the present invention in the ion trap mode.

When matrix-assisted desorption ionization is used to generate ions, ions are observed in three general mass regions. Region A is a low mass region that includes ions from the matrix used to absorb the laser light and is not characteristic of the sample (biological organism) under study. Region B is a middle mass region that includes primarily peptides whose molecular weights can be determined accurately and can be isotopically resolved. Region C is a high mass region with proteins unique to the organism but whose masses cannot be accurately determined. Thus in order to provide universal detection ranging from small chemical agents, bioregulators such as neuropepetides, and biomarkers from bacteria, viruses and spores, to large molecular weight toxins the mass spectrometer should have the broadest possible mass range. This provides the largest array of data points for identification when spectra are compared to a library of mass spectra of know bioagents and other microorganisms. This is accomplished when using the mass spectrometer in time-of-flight mode.

However, this is sometimes not sufficient because ions of the same mass may arise from more than one organism. Thus molecular ions in the middle mass region (region B) from approximately 500 to 3500 daltons can be dissociated to yield fragment ions that are characteristic of aminoacid sequences of the peptide. Few ions shown in the MS/MS mass spectrum 202 can provide sequence tags that distinguish this peptide from one of the similar mass from a different organism. This mass spectrum 202 is in turn obtained by using the mass spectrometer of the present invention in ion trap mode.

Therefore, the ability to switch the present mass spectrometer from a time-of-flight mode to an ion trap mode and vice versa allows one to acquire complementary information about the substance being studied.

Although the mass spectrometer of the present invention is shown in various specific embodiments, one of ordinary skill in the art would appreciate that variations to these embodiments can be made therein without departing from the spirit and scope of the present invention. For example, although the mass spectrometer is shown having one ring electrode and two end cap electrodes, one ordinary skill in the art would appreciate that adding one or more electrodes to the mass spectrometer is within the scope of the invention. Moreover, although the ion trap is shown and described with reference to a quadrupole mass spectrometer, one of ordinary skill in the art would appreciate that using a multipole field such as, for example, in two end caps—two ring electrodes configuration or in two end caps—three/multi ring electrodes configuration, is also within the scope of the invention. Similarly, although the mass spectrometer has been described with the use of a laser or an electron beam impact ionization source, one of ordinary skill in the art would appreciate that using electrospray, atmospheric pressure ionization (API) and atmospheric MALDI (APMALDI) are also within the scope of the present invention. The many features and advantages of the present invention are apparent from the detailed specification and thus, it is intended by the appended claims to cover all such features and advantages of the described apparatus which follow the true spirit and scope of the invention.

Furthermore, since numerous modifications and changes will readily occur to those of skill in the art, it is not desired to limit the invention to the exact construction and operation described herein. Moreover, the process and apparatus of the present invention, like related apparatus and processes used in the mass spectrometry arts tend to be complex in nature and are often best practiced by empirically determining the appropriate values of the operating parameters or by conducting computer simulations to arrive at a best design for a given application. Accordingly, all suitable modifications and equivalents should be considered as falling within the spirit and scope of the invention.

We claim:

1. A mass spectrometer comprising:

an ion source;

a detector arranged spaced apart from said ion source;

a first end cap electrode arranged proximate to said ion source;

a second end cap electrode arranged proximate said detector; and a ring electrode arranged between said first and said second end cap electrodes, said ring electrode being selectively connectable to either one of a radio-frequency voltage source and a constant voltage source, wherein when said ring electrode is connected to said radio-frequency voltage source said first end cap, said second end cap and said ring electrode form an ion trap and said mass spectrometer operates as an ion trap mass spectrometer, and when said ring electrode is connected to a constant voltage said mass spectrometer operates as a time-of-flight mass spectrometer.

2. A mass spectrometer according to claim 1, wherein said ion source comprises a sample plate and a source of ionizing energy.

3. A mass spectrometer according to claim 2, wherein said ion source further comprises an extraction electrode disposed proximate said sample plate.

4. A mass spectrometer according to claim 2, wherein said source of ionizing energy is a laser.

5. A mass spectrometer according to claim 2, wherein said source of ionizing energy is an electron beam source.

6. A mass spectrometer according to claim 2, wherein said source of ionizing energy is a source of an energetic ion beam.

7. A mass spectrometer according to claim 2, wherein said source of ionizing energy is a source of an energetic atom beam.

8. A mass spectrometer according to claim 2, wherein said source of ionizing energy is a radio-frequency voltage source.

9. A mass spectrometer according to claim 3, wherein said extraction electrode includes a grid electrode held at a voltage relative to said sample plate such that ions formed in said sample plate are extracted from said sample plate and directed toward an opening in said first end cap electrode.

10. A mass spectrometer according to claim 1, wherein said first end cap electrode and said second end cap electrode are held at one of a constant voltage when said mass spectrometer operates as the time-of-flight mass spectrometer.

11. A mass spectrometer according to claim 1, wherein said first end cap electrode and said second end cap electrode are connected to a radio-frequency voltage source when said mass spectrometer operates as an ion trap mass spectrometer.

12. A mass spectrometer according to claim 2, wherein said sample plate is held at a sample voltage.

13. A mass spectrometer according to claim 12, wherein said sample voltage is a voltage with a magnitude between about 10 to 500 volts when said mass spectrometer operates as an ion trap mass spectrometer.

14. A mass spectrometer according to claim 12, wherein said sample voltage is a voltage with a magnitude between about 1 kilovolt to 50 kilovolts when said mass spectrometer operates as a time-of-flight mass spectrometer.

15. A mass spectrometer according to claim 12, wherein said sample voltage is pulsed to focus ions formed in said ion source.

16. A mass spectrometer according to claim 3, wherein said extraction electrode is held at an extraction voltage.

17. A mass spectrometer according to claim 16, wherein said extraction voltage is a voltage with a magnitude between about 10 to 500 volts when said mass spectrometer operates as an ion trap mass spectrometer.

18. A mass spectrometer according to claim 16, wherein said extraction voltage is a voltage with a magnitude between about 1 kilovolt to 50 kilovolts when said mass spectrometer operates as a time-of-flight mass spectrometer.

19. A mass spectrometer according to claim 1, wherein at least one of said first end cap electrode and said second end cap electrode comprises a hyperboloid shaped surface.

20. A mass spectrometer according to claim 1, wherein at least one of said first end cap electrode and said second end cap electrode comprises a cylindrical shaped surface.

21. A mass spectrometer according to claim 1, wherein said second end cap electrode comprises an opening such that ions in between said first end cap electrode and said second end cap electrode exit through said opening to reach said detector.

22. A mass spectrometer according to claim 1, wherein said ring electrode comprises a surface having a hyperboloid shape.

23. A mass spectrometer according to claim 1, wherein said detector comprises a channeltron arranged to intercept particles to be measured.

24. A mass spectrometer according to claim 1, wherein said detector comprises an electron multiplier arranged to intercept particles to be measured.

25. A mass spectrometer according to claim 1, wherein said detector comprises a microchannel plate assembly arranged to intercept particles to be measured.

26. A mass spectrometer according to claim 1, wherein said time-of-flight mass spectrometer is adapted to detect the arrival of ions at said detector and measure arrival times of said ions.

27. A mass spectrometer according to claim 1, wherein said ion trap mass spectrometer is adapted to detect resonant ejection of ions while scanning a fundamental radio-frequency amplitude.

28. A mass spectrometer according to claim 1, wherein said ion trap mass spectrometer is adapted to detect the arrival of ions at said detector at various radio-frequency voltages.

29. A mass spectrometer according to claim 2, wherein said first cap electrode, said second cap electrode and said ring electrode are movable together relative to said sample plate, said sample plate being held at a fixed position.

30. A method for identifying biomolecules with a mass spectrometer, comprising:

ionizing said biomolecules with an ionizer to obtain a plurality of ions;

analyzing masses of said ions with said mass spectrometer in a time-of-flight mode;

switching said mass spectrometer to operate in an ion trap mode; and analyzing fragment masses of at least ions of one mass in said plurality of ions.

* * * * *